US009053356B2

(12) United States Patent
Ueki

(10) Patent No.: US 9,053,356 B2
(45) Date of Patent: Jun. 9, 2015

(54) ATTRIBUTE DETERMINING METHOD, ATTRIBUTE DETERMINING APPARATUS, PROGRAM, RECORDING MEDIUM, AND ATTRIBUTE DETERMINING SYSTEM

(75) Inventor: Kazuya Ueki, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 130 days.

(21) Appl. No.: 13/880,436

(22) PCT Filed: Sep. 22, 2011

(86) PCT No.: PCT/JP2011/071562
§ 371 (c)(1),
(2), (4) Date: Apr. 19, 2013

(87) PCT Pub. No.: WO2012/053311
PCT Pub. Date: Apr. 26, 2012

(65) Prior Publication Data
US 2013/0230217 A1   Sep. 5, 2013

(30) Foreign Application Priority Data
Oct. 22, 2010   (JP) ................................. 2010-237945

(51) Int. Cl.
*G06K 9/00* (2006.01)
(52) U.S. Cl.
CPC ........ *G06K 9/00268* (2013.01); *G06K 9/00228* (2013.01); *G06K 9/00369* (2013.01)
(58) Field of Classification Search
CPC ............ G06K 9/00228; G06K 9/6256; G06K 9/00221; G06T 7/0081; G06T 7/0012; G06T 2207/10016; G06T 7/408; G06T 2207/10116
USPC .......... 382/118, 159, 195, 128, 103, 165, 132
See application file for complete search history.

(56) References Cited

U.S. PATENT DOCUMENTS

2011/0091071 A1*   4/2011   Sabe et al. .................... 382/103

FOREIGN PATENT DOCUMENTS

| JP | 10-307923 A | 11/1998 |
| JP | 2005-250712 A | 9/2005 |

(Continued)

OTHER PUBLICATIONS

Kobayashi et al: an English machine translation of JP2005-250712, 2005.*
Hirai et al: an English machine translation of JP2009-199322, 2009.*
Satoshi Imaizumi et al., "Method of Gender and Age-Group Estimation by Integrating Multiple Information", Technical Report of IEICE, 2003, pp. 13-18.
International Search Report for PCT/JP2011/071562 dated Oct. 25, 2011.

(Continued)

*Primary Examiner* — Ruiping Li
(74) *Attorney, Agent, or Firm* — Sughrue Mion, PLLC

(57) ABSTRACT

The present invention is to provide an attribute determining method, an attribute determining apparatus, a program, a recording medium, and an attribute determining system of high detection accuracy of a person with which an attribute of a person can be determined, for example, even in the case where characteristic parts of the face are hidden.

The attribute determining method of the present invention includes an image acquiring step (S11) of acquiring an image of a person to be determined, an attribute determination region detecting step (S21) of detecting at least two attribute determination regions selected from the group consisting of a head region, a facial region, and other regions from the image of a person to be determined, and an attribute determining step (S22) of determining an attribute based on images of the at least two attribute determination regions.

10 Claims, 8 Drawing Sheets

(56) References Cited

FOREIGN PATENT DOCUMENTS

| JP | 2009199322 A | 9/2009 |
|---|---|---|
| JP | 2010-231254 A | 10/2010 |
| JP | 2010-244090 A | 10/2010 |

OTHER PUBLICATIONS

Office Action dated Mar. 4, 2014, issued by the Japan Patent Office in corresponding Japanese Application No. 2012-539649.

* cited by examiner

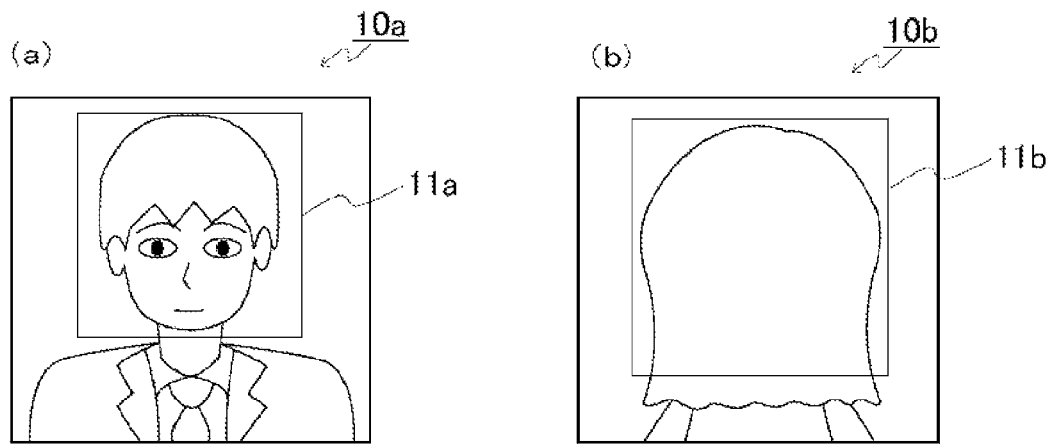
FIG. 2A
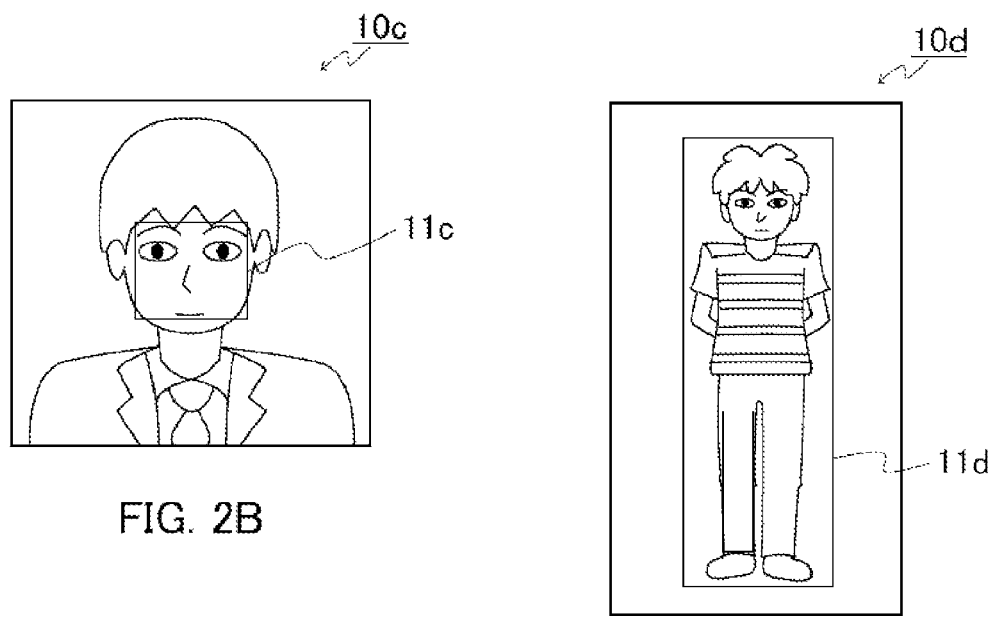
FIG. 2B
FIG. 2C

ATTRIBUTE DETERMINING METHOD, ATTRIBUTE DETERMINING APPARATUS, PROGRAM, RECORDING MEDIUM, AND ATTRIBUTE DETERMINING SYSTEM

CROSS REFERENCE TO RELATED APPLICATIONS

This application is a National Stage of International Application No. PCT/JP2011/071562 filed Sep. 22, 2011, claiming priority based on Japanese Patent Application No. 2010-237945 filed Oct. 22, 2010, the contents of all of which are incorporated herein by reference in their entirety.

TECHNICAL FIELD

The present invention relates to an attribute determining method, an attribute determining apparatus, a program, a recording medium, and an attribute determining system.

BACKGROUND ART

A system for detecting a person from an image and determining attributes such as an age and a gender is utilized in various occasions such as various image communications such as a videoconference and a videophone; database searching; a security system such as a building security; and a facial recognition system. For example, there is a method of determining that the image shows the face of a person by performing pattern recognition with facial parts such as the eyes, the eyebrows, the nostril, and the mouth, which are characteristic parts of the face of a person, detecting the person in the image, and further determining an attribute of the person (for example, see Patent Document 1). The method of detecting a part of the face is performed in the following order. First, the head of the person is detected and then a facial part is extracted.

RELATED ART DOCUMENT

Patent Document

[Patent Document 1] JP H10(1998)-307923 A

SUMMARY OF INVENTION

Problem to be Solved by the Invention

However, in the attribute determining method using the face, there are problems that the detection of a person and the determination of an attribute of a person are difficult if a part of characteristic parts of the face is hidden and the detection and the determination can be performed only with a person facing nearly the front. Therefore, in the case where the method of this type is applied to the detection of a person and the determination of an attribute of a person, there is a need to provide a camera at a place suitable for shooting a person facing the front. However, in general, providing a camera at such a place is usually difficult. Further, since movements of people are generally irregular, the front-facing face cannot be always detected.

Hence, the present invention is intended to provide an attribute determining method, an attribute determining apparatus, a program, a recording medium, and an attribute determining system of high detection accuracy of a person with which an attribute of a person can be determined, for example, even in the case where characteristic parts of the face are hidden.

Means for Solving Problem

In order to achieve the aforementioned object, the attribute determining method of the present invention includes:
an image acquiring step of acquiring an image of a person to be determined;
an attribute determination region detecting step of detecting at least two attribute determination regions selected from the group consisting of a head region, a facial region, and other regions from the image of a person to be determined; and
an attribute determining step of determining an attribute based on images of the at least two attribute determination regions.

The attribute determining apparatus of the present invention includes:
an image acquiring unit acquiring an image of a person to be determined;
an attribute determination region detecting unit detecting at least two attribute determination regions selected from the group consisting of a head region, a facial region, and other regions from the image of a person to be determined; and
an attribute determining unit determining an attribute based on images of the at least two attribute determination regions.

The program of the present invention causes a computer to execute the attribute determining method according to the present invention.

The recording medium of the present invention is recorded with the program according to the present invention.

The attribute determining system of the present invention includes:
an image acquiring unit acquiring an image of a person to be determined;
an attribute determination region detecting unit detecting at least two attribute determination regions selected from the group consisting of a head region, a facial region, and other regions from the image of a person to be determined;
an attribute determining unit determining an attribute based on images of the at least two attribute determination regions; and
an output unit outputting a result of an attribute determination, wherein the image acquiring unit and the output unit are connected to the attribute determination region detecting unit and the attribute determining unit via a communication network provided outside of the system.

Effects of the Invention

The present invention can provide an attribute determining method, an attribute determining apparatus, a program, a recording medium, and an attribute determining system of high detection accuracy of a person with which an attribute of a person can be determined, for example, even in the case where characteristic parts of the face are hidden.

BRIEF DESCRIPTION OF DRAWINGS

FIGS. 2A(a) and (b) are views for explaining examples of applications of head regions (positive examples) to images for learning in the present invention.

FIG. 2B is a view for explaining an example of application of a facial region (positive example) to an image for learning in the present invention.

FIG. 2C is a view for explaining an example of application of a whole-body region (positive example) to an image for learning in the present invention.

DESCRIPTION OF EXEMPLARY EMBODIMENT

In the present invention, the other region may be a region including a head region or a facial region, and examples of the other region include the whole-body and a part of the whole-body (upper body or the like).

Next, Embodiments of the present invention will be described. Note here that the present invention is not limited or restricted by the Embodiments described below. In the following FIGS. 1 to 4, identical parts are indicated with identical numerals and symbols.

[Exemplary Embodiment 1]

Figure 1A:
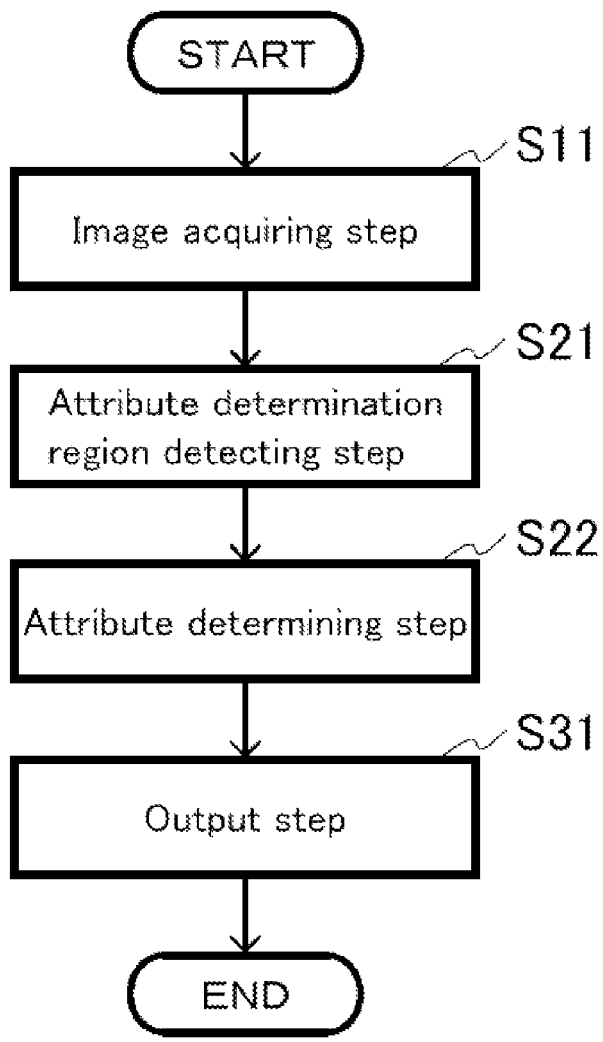
FIG. 1A is a flowchart showing an example (first exemplary embodiment) of the attribute determining method of the present invention.
Figure 1B:
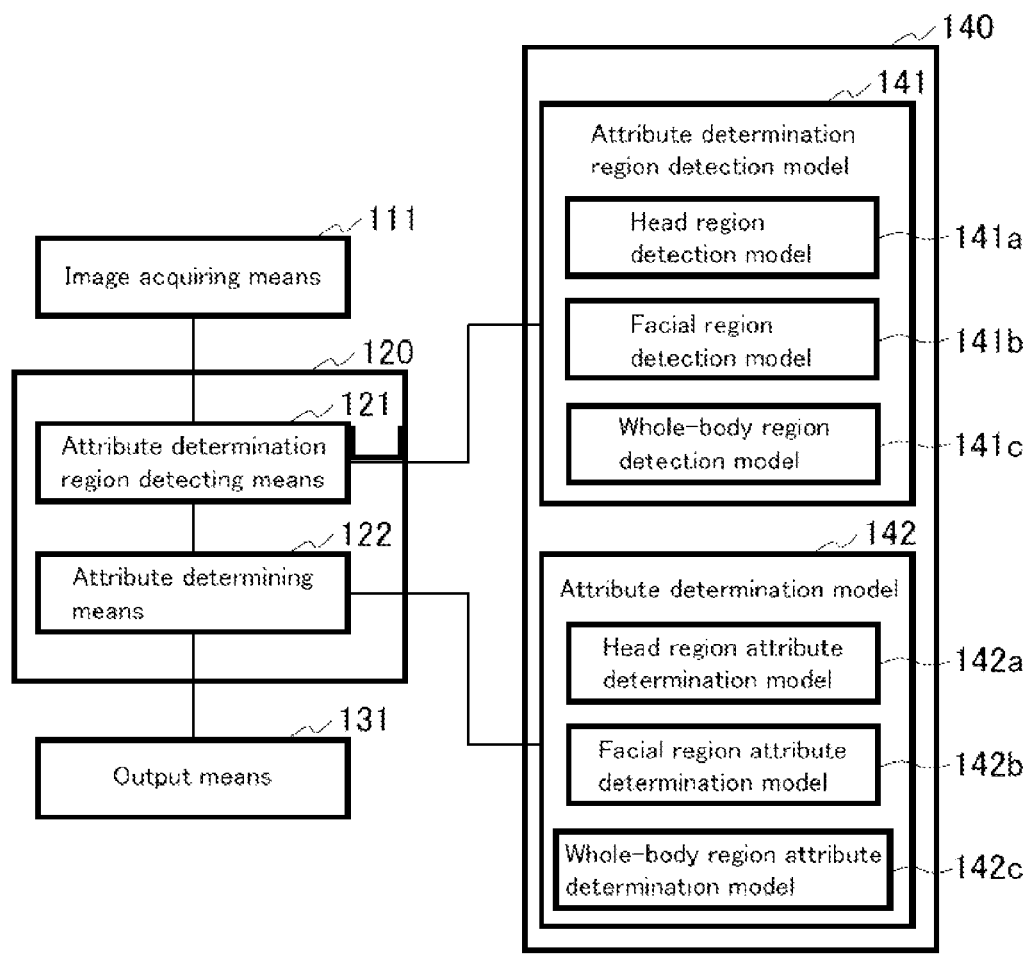
FIG. 1B is a block diagram showing the configuration of an example (first exemplary embodiment) of the attribute determining apparatus of the present invention.

The first exemplary embodiment is an example of the case where the other region is the whole-body. FIG. 1A shows a flowchart of the attribute determining method of the first exemplary embodiment. FIG. 1B shows a block diagram of the attribute determining apparatus of the first exemplary embodiment. As shown in FIG. 1B, the attribute determining apparatus of the first exemplary embodiment includes image acquiring means (unit) 111, computing means (unit) 120, output means (unit) 131, and data storage means (unit) 140 as main components. The image acquiring means 111 is connected to the computing means 120. The computing means 120 is connected to the output means 131 and the data storage means 140. The computing means 120 includes attribute determination region detecting means (unit) 121 and attribute determining means (unit) 122. Preliminarily acquired attribute determination region detection model 141 and attribute determination model 142 are stored in the data storage means 140. The attribute determination region detecting means 121 is connected to the attribute determination region detection model 141. The attribute determining means 122 is connected to the attribute determination model 142. The attribute determination region detection model 141 includes a head region detection model 141a, a facial region detection model 141b, and a whole-body region detection model 141c. The attribute determination model 142 includes a head region attribute determination model 142a, a facial region attribute determination model 142b, and a whole-body region attribute determination model 142c.

Examples of the image acquiring means 111 include a charge coupled device (CCD) camera, a complementary metal oxide semiconductor (CMOS) camera, and an image scanner. An example of the computing means 120 includes a central processing unit (CPU). Examples of the output means 131 include a monitor outputting data by an image (for example, image displays such as a liquid crystal display (LCD) and a cathode-ray tube (CRT) display), a printer outputting data by printing, and a speaker outputting data by sounds. The output means 131 is an optional component. The attribute determining apparatus of the present invention preferably includes the output means 131 although it is not always necessary. Examples of the data storage means 140 include a random access memory (RAM), a read-only memory (ROM), a hard disk (HD), an optical disk, and a floppy (registered trade name) disk (FD). The data storage means 140 may be, for example, a built-in type or an external type such as an external storage device. With respect to the image acquiring means, the computing means, the output means, and the data storage means, the same applies to the Embodiments described below.

In the present invention, the attribute is an attribute relating to a person, and examples of the attribute include a gender, an age, a race, the angle of the head, the length of the hair, with or without a hat, the color of the hair, a hairstyle, the direction of the face, facial expressions, with or without glasses or sunglasses, with or without a mask, and with or without mustache or beard.

The attribute determining method of the first exemplary embodiment is performed, for example, using the attribute determining apparatus shown in FIG. 1B as follows.

First, before performing the attribute determining method, the head region detection model 141a and head region attribute determination model 142a; the facial region detection model 141b and facial region attribute determination model 142b; and the whole-body region detection model 141c and the whole-body region attribute determination model 142c are formed by performing learning using the technique of machine learning (pattern recognition).

<Head Region Detection Model and Head Region Attribute Determination Model>

The head region detection model 141a is formed by performing learning by machine learning (pattern recognition) with head regions of images for learning as positive examples and with non-head regions of images for learning as negative examples. Specifically, for example, as shown in FIGS. 2A(a) and (b), first, the head regions are applied by respectively applying labels 11a and 11b to the heads of the images for learning 10a (front-facing male) and 10b (rear-facing female). Application of the training data to the head region is made by a person by inputting using conventionally known input means such as a keyboard, a mouse, or the like, for example. In consideration of detection accuracy, the more the number of the images for learning, the better. In addition, it is preferable to prepare a lot of images for learning (for example, side-facing image and the like) for forming the head region detection model.

Next, by applying training data for determining attribute to the head regions and using many head regions to each of which the training data for determining attribute is applied, the head region attribute determination model 142a is formed by machine learning (pattern recognition). In the attribute determining method of the first exemplary embodiment, examples of the training data for determining attribute include a gender and an age. Specifically, for example, the training data for determining attribute such as "gender: male", "age: 30", or the like is applied to the head region of the image for learning shown in FIG. 2A(a). For example, the training data for determining attribute such as "gender: female", "age: 20", or the like is applied to the image for learning shown in FIG. 2A(b). Application of the training data for determining attribute such as the gender, the age, or the like is made by a person by inputting using conventionally known input means such as a keyboard, a mouse, or the like, for example. Furthermore, in the case of using the item of the "direction" of the head region for attribute determination, for example, the training data for determining attribute of the direction of the head region such as the direction data indicated on one degree basis (for example, leftward 60°), the direction data according to the 8 directions (for example, 0°, 45°, 90°, and etc.), or the like can also be applied. Further, the attribute determination can also be performed, without employing learning, by employing the method (head region attribute determination rule) in which a human makes a rule and determines an attribute, for example.

<Facial Region Detection Model and Facial Region Attribute Determination Model>

The facial region detection model 141*b* is formed by learning a facial region (region including characteristic parts of the face of a person such as the eyes, the eyebrows, the nostril, and the mouth) of an image for learning by machine learning (pattern recognition). As shown in FIG. 2B, first, the facial region is applied by applying a label 11*c* to an image for learning 10*c* (front-facing male). Application of the training data to the facial region is made by a person by inputting using conventionally known input means such as a keyboard, a mouse, or the like, for example. In consideration of detection accuracy, the more the number of the images for learning, the better. In addition, it is preferable to prepare a lot of images for learning for forming the facial region detection model. The facial region detection model may include, for example, the relative position, the size, and the like of the facial parts.

Next, by applying training data for determining attribute to the facial region and using many head regions to each of which the training data for determining attribute is applied, the facial region attribute determination model 142*b* is formed by machine learning (pattern recognition). In the attribute determining method of the first exemplary embodiment, examples of the training data for determining attribute include a gender and an age. Specifically, for example, the training data for determining attribute such as "gender: male", "age: 30", or the like is applied to the facial region of the image for learning shown in FIG. 2B. Application of the training data for determining attribute such as the gender, the age, or the like is made by a person by inputting using conventionally known input means such as a keyboard, a mouse, or the like, for example. Further, the attribute determination can also be performed, without employing learning, by employing the method (facial region attribute determination rule) in which a human makes a rule and determines an attribute, for example.

<Whole-Body Region Detection Model and Whole-Body Region Attribute Determination Model>

The whole-body region detection model 141*c* is formed by performing learning by machine learning (pattern recognition) with whole-body regions of images for learning as positive examples and with non-whole-body regions of images for learning as negative examples. Specifically, for example, as shown in FIG. 2C, first, the whole-body region is applied by applying a label 11*d* to the whole-body of the image for learning 10*d* (front-facing male). Application of the training data to the whole-body region is made by a person by inputting using conventionally known input means such as a keyboard, a mouse, or the like, for example. In consideration of detection accuracy, the more the number of the images for learning, the better. In addition, it is preferable to prepare a lot of images for learning for forming the whole-body region detection model.

Next, by applying training data for determining attribute to the whole-body region and using many whole-body regions to each of which the training data for determining attribute is applied, the whole-body region attribute determination model 142*c* is formed by machine learning (pattern recognition). In the attribute determining method of the first exemplary embodiment, examples of the training data for determining attribute include a gender and an age. Specifically, for example, the training data for determining attribute such as "gender: male", "age: 30", or the like is applied to the whole-body region of the image for learning shown in FIG. 2C. Application of the training data for determining attribute such as the gender, the age, or the like is made by a person by inputting using conventionally known input means such as a keyboard, a mouse, or the like, for example. Further, the attribute determination can also be performed, without employing learning, by employing the method (whole-body region attribute determination rule) in which a human makes a rule and determines an attribute, for example. Furthermore, in the case of using the item of the "direction" of the body for attribute determination, for example, the training data for determining attribute of the direction of the body such as the direction data indicated on one degree basis (for example, leftward 60°), the direction data according to the 8 directions (for example, 0°, 45°, 90°, and etc.), or the like can also be applied.

Next, as shown in the flowchart of FIG. 1A, the following steps are performed. First, an image of person(s) to be determined is acquired by the image acquiring means 111 (step S11).

Next, by the attribute determination region detecting means 121, by referring to the attribute determination region detection model 141 formed preliminarily by performing learning using many images for learning to each of which the training data of the attribute determination region is applied, from the image of person(s) to be determined, the data of at least two attribute determination regions selected from the group consisting of the head region, the facial region, and the whole-body region is detected (step S21).

<Detection of Head Region Data>

Specifically, for example, by specifying the size of a head region desired to be detected (for example, square) and by referring to the head region detection model 141*a* preliminarily formed, the head region data is detected by a so-called raster scanning by moving the image patch in the horizontal direction from the end of the image of person(s) to be determined and continuously moving downward in order. In addition, for example, by changing the acquiring size of the image of person(s) to be determined and searching the head region, the data of the head region is detected. It is preferable to detect the data of the head region in this manner because the alignment of the head region can be performed at the same time. Note here that the detection of the head region data is not limited to this example. For example, the detection can be performed by detecting a circular object in the image of person(s) to be determined as a head region and performing the alignment of the detected head region. The alignment may be performed, for example, by alignment means (unit) (not shown) contained in the computing means.

<Detection of Facial Region Data>

Specifically, for example, the facial region data is detected from the image of person(s) to be determined by referring to the preliminarily formed facial region detection model 141$b$ as a part that matches the facial region detection model 141$b$.

<Detection of Whole-Body Region Data>

Specifically, for example, the whole-body region data is detected by the same method as the head region detection by specifying the size of a whole-body region desired to be detected (for example, rectangle) and by referring to the whole-body region detection model 141$c$ preliminarily formed.

Next, an attribute is determined based on the images of at least two attribute determination regions by the attribute determining means 122 by referring to the attribute determination model 142 formed preliminarily by performing learning using many attribute determination regions to each of which the training data for determining attribute is applied (step S22). Specifically, for example, the attribute of each attribute determination region image is determined to determine whether or not each of the attribute determination region images belongs to the same person, and the attribute is determined by combining the respective attribute determination region images that belong to the same person. In the case of performing the attribute determination by the machine learning, both the method (regression) of estimating continuous values such as an age and the method (classification) of estimating categories such as male/female can be used.

<Attribute Determination Based on Head Region Image>

Examples of the determination item of the attribute determination based on the head region image include a gender, an age, a race, the angle of the head, the length of the hair, with or without a hat, the color of the hair, a hairstyle, the direction of the face, facial expressions, with or without glasses or sunglasses, with or without a mask, and with or without mustache or beard.

In the case where the determination item is a gender, for example, the determination can be made based on a gender degree (for example, 0 to 1). The gender degree can be calculated based on the head region data. Specifically, for example, a criterion is set as follows. That is, it is determined as "female" if the gender degree is "0 to less than 0.5" and it is determined as "male" if the gender degree is "0.5 to 1". Determination of the gender is performed from the value of the calculated gender degree. The criterion for determining gender from the gender degree is not limited to this example. For example, the criterion can be as follows. That is, it is determined as "female" if the gender degree is "0 to 0.3", it is determined as "male" if the gender degree is "0.7 to 1", and it is determined as "undeterminable" if the gender degree is "more than 0.3 and less than 0.7". Also with respect to the age and the like, for example, by setting predetermined criteria, determination of the age and the like is performed from the values calculated based on the head region data.

<Attribute Determination Based on Facial Region Image>

Examples of the determination item of the attribute determination based on the facial region image include those described for the determination item of the attribute determination based on the head region image. The attribute based on the facial region image can be determined in the same manner as the attribute determination based on the head region image, for example.

<Attribute Determination Based on Whole-Body Region Image>

Examples of the determination item of the attribute determination based on the whole-body region image include those described for the determination item of the attribute determination based on the head region image. The attribute based on the whole-body region image can be determined in the same manner as the attribute determination based on the head region image, for example.

<Determination of Whether or not Respective Attribute Determination Region Images Belong to the Same Person>

Next, whether or not each of the head region, the facial region, and the whole-body region belongs to the same person is determined. This determination is made using an overlap degree represented by the following equation (3). Note here that the determination of whether or not to belong to the same person may be made before the attribute determination of the respective attribute determination region images, for example. That is, for example, after preliminarily determining whether or not each of the head region, the facial region, and the whole-body region belongs to the same person, the attribute determination of the head region, the facial region, and the whole-body region that belong to the same person can be made.

$$\text{overlap degree} = (2 \times X \times Y)/(X+Y) \qquad (3)$$

X: Ratio of the area of a region in which one of the attribute determination regions and a region obtained by deforming an attribute determination region other than the one of the attribute determination regions at a predetermined ratio are overlapped to the area of the one of the attribute determination regions Y: Ratio of the area of the overlapped region to the area of the region obtained by deforming at a predetermined ratio <Specific Example of Overlap Degree Calculation>

The overlap degree represented by the equation (3) will be described below with reference to specific examples. However, the overlap degree is not limited to the following examples.

<Overlap Degree of Facial Region and Head Region>

Figure 2D:
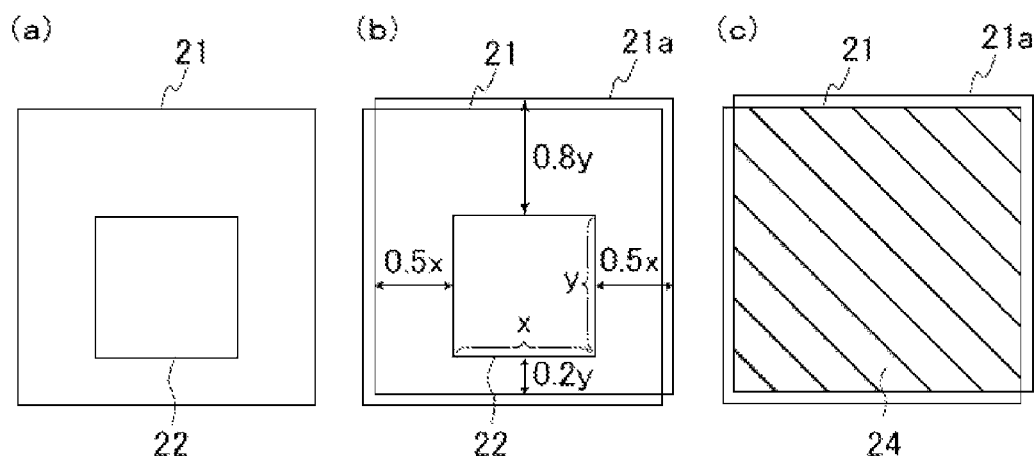
FIG. 2D(a) to (c) are views for explaining an example of calculation of an overlap degree of a head region and a facial region.

First, the overlap degree of the facial region and the head region will be described. That is, first, as shown in FIG. 2D(a), the head region (A) 21 and the facial region 22 are detected from the obtained image of person(s) to be determined. Next, as shown in FIG. 2D(b), the detected facial region 22 is deformed at a predetermined ratio. This region refers to the head region (B) 21$a$. Specifically, for example, in the case where the lateral size of the facial region 22 is x and the longitudinal size of the facial region 22 is y, the region obtained by respectively extending the facial region 22 in the right and left directions 0.5 times the x, extending the facial region 22 in the upper direction 0.8 times the y, and extending the facial region 22 in the lower direction 0.2 times the y refers to the head region (B) 21$a$. Next, as shown in FIG. 2D(c), the area of the region (C, diagonally shaded area) 24 in which the head region (A) 21 and the head region (B) 21$a$ are overlapped is calculated. Then, as indicated by the following equation (1), the ratio (X) of the area of the overlapped region (C) to the area of the head region (A) is calculated.

$$X = C/A \qquad (1)$$

Further, as indicated by the following equation (2), the ratio (Y) of the area of the overlapped region (C) to the area of the head region (B) is calculated.

$$Y = C/B \qquad (2)$$

On the basis of the ratios (X) and (Y), as indicated by the following equation (3), the overlap degree of the head region and the facial region is calculated.

$$\text{overlap degree} = (2 \times X \times Y)/(X+Y) \qquad (3)$$

<Overlap Degree of Head Region and Whole-Body Region>

Figure 2E:
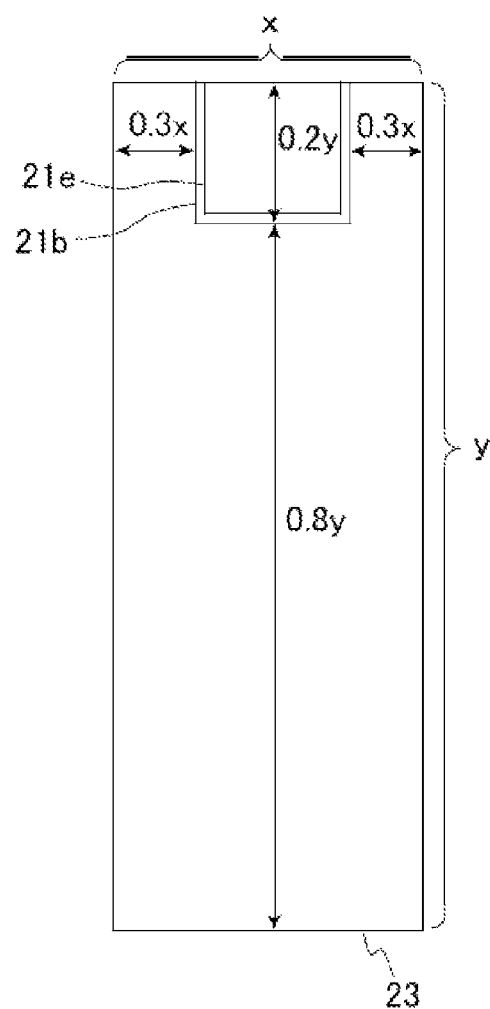
FIG. 2E is a view for explaining an example of calculation of an overlap degree of a head region and a whole-body region.

Next, the overlap degree of the head region and the whole-body region will be described. That is, first, the head region (A) and the whole-body region are detected from the obtained image of person(s) to be determined. Next, as shown in FIG. 2E, the detected whole-body region 23 is deformed at a predetermined ratio. This region refers to the head region (D) 21b. Specifically, for example, in the case where the lateral size of the whole-body region 23 is x and the longitudinal size of the whole-body region 23 is y, the region obtained by respectively narrowing the whole-body region 23 in the right and left directions 0.3 times the x and narrowing the whole-body region 23 in the lower direction 0.8 times the y refers to the head region (D) 21b. In FIG. 2E, 21e refers to the head region (A). Next, in the same manner as described above, the area of the region (C) in which the head region (A) and the head region (D) are overlapped is calculated. Next, in the same manner as the equation (1), the ratio (X) of the area of the overlapped region (C) to the area of the head region (A) is calculated. Further, in the same manner as the equation (2), the ratio (Y) of the area of the overlapped region (C) to the area of the head region (D) is calculated. Then, on the basis of the ratios (X) and (Y), as indicated by the following equation (3), the overlap degree of the head region and the whole-body region is calculated.

$$\text{overlap degree} = (2 \times X \times Y)/(X+Y) \qquad (3)$$

Besides the aforementioned two specific examples, in the case of calculating the overlap degree of the facial region and the whole-body region, for example, the overlap degree may be calculated in the same manner as described above with the region obtained by narrowing (deforming) the whole-body region at a predetermined ratio as the facial region. Further, for example, the overlap degree of the head region and the facial region may be calculated in the same manner as described above with the region obtained by narrowing (deforming) the head region at a predetermined ratio as the facial region. Furthermore, for example, the overlap degree of the head region and the whole-body region may be calculated in the same manner as described above with the region obtained by extending (deforming) the head region at a predetermined ratio as the whole-body region.

The overlap degree is expressed as numerical values from 1 (maximum value) to 0 (minimum value). In the attribute determining method of the first exemplary embodiment, for example, in the case where the overlap degree is equal to or more than the value of a predetermined threshold (for example, overlap degree ≥0.7), it may be determined that each of the head region, the facial region, and the whole-body region belongs to the same person.

<Attribute Determination by Combination of Attribute Determination Region Images>

Next, an attribute is determined by combining the images of the head region, the facial region, and the whole-body region, which were determined to be belonged to the same person. Combination of the determination items (determination results) can be performed by the following equation (4). In the following equation (4), "n" indicates the number of images (frames) to be determined and "i" indicates the image number of an image to be determined.

$$\text{Attribute degree of object to be determined} = \qquad (4)$$

$$\frac{\sum_{i=1}^{n} \left\{ \begin{pmatrix} \text{Confidence level in} \\ \text{determination item} \\ \text{in image } i \end{pmatrix} \times (\text{Attribute degree}) \right\}}{\sum_{i=1}^{n} \begin{pmatrix} \text{Confidence level} \\ \text{in determination item in image } i \end{pmatrix}}$$

Next, the determination result of the attribute is outputted by the output means 131 (step S31). Examples of the determination item are the same as those described above. The output step S31 is an optional step. The attribute determining method of the present invention preferably includes the output step S31 although it is not always necessary.

The attribute determination region detecting step and the attribute determining step will be described below with reference to specific examples of the images of person(s) to be determined acquired by the image acquiring means 111. However, the present invention is not limited to the following examples.

Figure 3A:
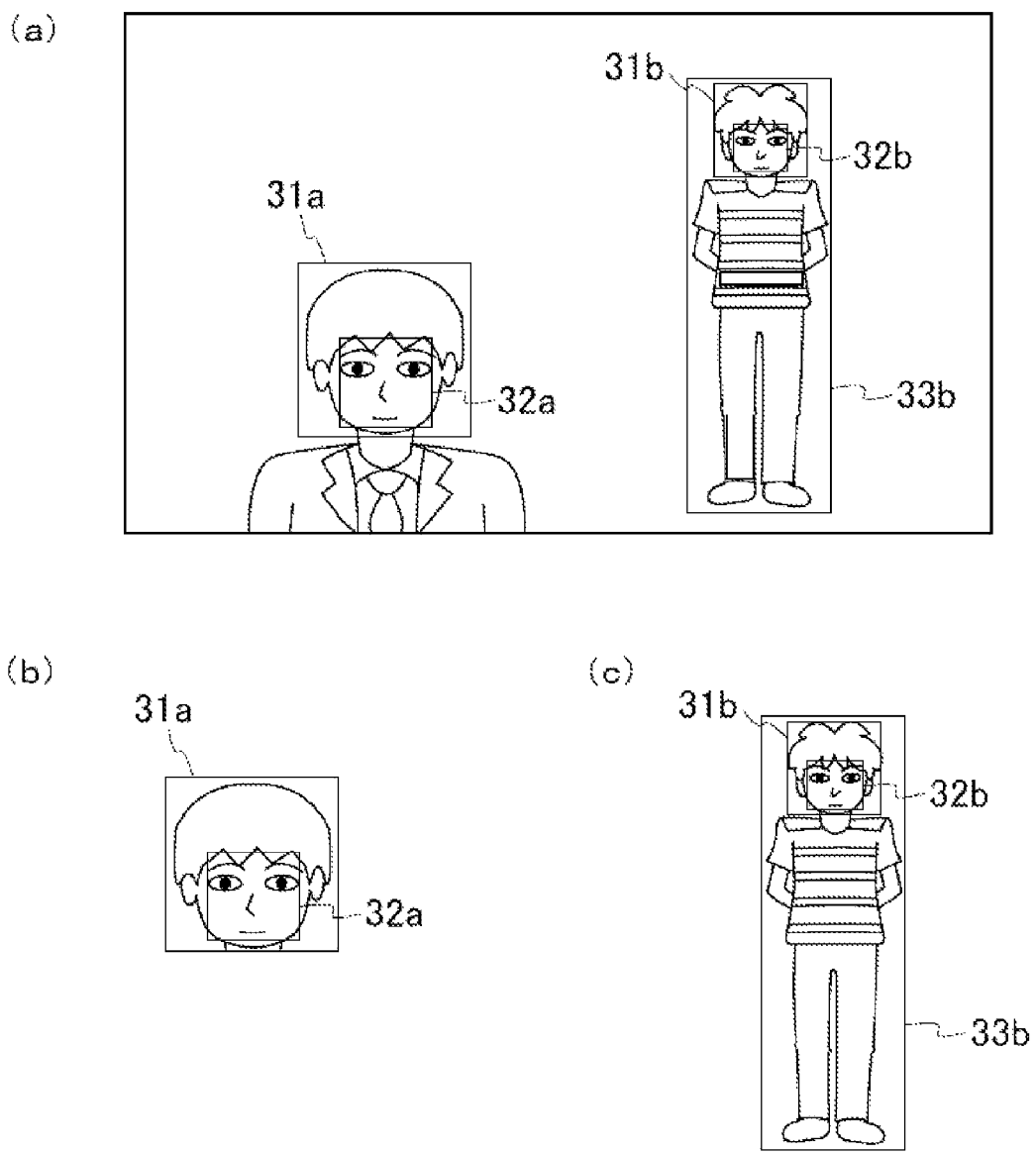
FIGS. 3A(a) to (c) are views for explaining an example of the attribute determination region detecting step and the attribute determining step in the present invention.

FIG. 3A(a) is a view of an example of an image of person(s) to be determined, which shows more than one person. FIG. 3A(a) shows the chest up of a person on the left side and shows the whole-body of a front-facing person on the right side.

First, by the attribute determination region detecting means 121, by referring to the attribute determination region detection model 141 acquired preliminarily, attribute determination regions are detected. As a result, as shown in FIG. 3A(a), for example, the head regions 31a and 31b, the facial regions 32a and 32b, and the whole-body region 33b are detected.

Next, by the attribute determining means 122, by referring to the attribute determination model 142 acquired preliminarily, attributes of the head regions 31a and 31b, the facial regions 32a and 32b, and the whole-body region 33b are determined.

Next, whether or not each of the head regions 31a and 31b, the facial regions 32a and 32b, and the whole-body region 33b belongs to the same person is determined using the overlap degree. Then, for example, it is determined that the head region 31a and the facial region 32a belong to the person on the left side in FIG. 3A(a) and the head region 31b, the facial region 32b, and the whole-body region 33b belong to the person on the right side in FIG. 3A(a).

Next, as shown in FIG. 3A(b), the attribute is determined by combining the head region 31a and the facial region 32a. Further, as shown in FIG. 3A(c), the attribute is determined by combining the head region 31b, the facial region 32b, and the whole-body region 33b.

In the case where the item to be determined is a gender, the combination shown in FIG. 3A(b) can be performed by the following equation (5), for example.

$$\text{Gender degree of object to be determined} = \qquad (5)$$

$$\frac{\begin{pmatrix} \text{Confidence level} \\ \text{in gender of head} \end{pmatrix} \times \begin{pmatrix} \text{Gender degree} \\ \text{of head} \end{pmatrix} + \begin{pmatrix} \text{Confidence level} \\ \text{in gender of face} \end{pmatrix} \times \begin{pmatrix} \text{Gender degree} \\ \text{of face} \end{pmatrix}}{\begin{pmatrix} \text{Confidence level} \\ \text{in gender of head} \end{pmatrix} + \begin{pmatrix} \text{Confidence level} \\ \text{in gender of face} \end{pmatrix}}$$

In the equation (5), the "gender degree of head" is the gender degree of the head region calculated in the attribute determining step S22. The "gender degree of face" is the gender degree of the facial region calculated in the attribute determining step S22. The "confidence level in gender of head" can be expressed, for example, by a value greater than 0 and not more than 1 and indicates the level of the reliability of the gender degree of the head region calculated in the attribute determining step S22. Further, the "confidence level in gender of face" can be expressed, for example, by a value greater than 0 and not more than 1 and indicates the level of the reliability of the gender degree of the facial region calculated in the attribute determining step S22. The confidence level of the head region and the confidence level of the facial region can be determined, for example, according to the performance of the model to be used. For example, in the case where the reliability is 70% accuracy when the gender is determined based on the image of the head region and the reliability is 80% accuracy when the gender is determined based on the image of the facial region, by increasing the confidence level of the latter, the determination can be made with high accuracy.

Further, for example, since the dark-tone of the whole image of person(s) to be determined results in the dark-tone of the whole head region, there is a case where the gender degree is biased toward a male despite the fact that the person in the image is a female. In such a case, since the reliability of the determination of the gender at the head region is low under the condition where the tone of the whole image of person(s) to be determined is dark, the confidence level in gender of the head region is set low (numerical value of nearly 0).

An example of the condition having an influence on the confidence level in gender of the face includes the angle (direction) of the face. In the case where it is known that accuracy is high if the gender is determined based on the facial image of a front-facing person and accuracy is slightly decreased if the gender is determined based on the facial image of a diagonally-facing person, the confidence level of the former case is set high (numerical value of nearly 1) and the confidence level of the latter case is set low (numerical value of nearly 0). Examples of the condition having an influence on the confidence level include, besides the angle (direction) of the face, the hiding level of the face, the quality of the image of person(s) to be determined, the size of the facial region in the image of person(s) to be determined, the condition of shining of the light, and the intensity of the contrast. Specifically, with respect to the hiding level of the face, for example, the confidence level is set low in the case where a hidden area is large. With respect to the quality of the image of person(s) to be determined, for example, the confidence level is set low in the case of an image with large camera shaking or of a noisy image. With respect to the size of the facial region in the image of person(s) to be determined, for example, the confidence level is set low in the case where the facial region is small. With respect to the condition of shining of the light, for example, the confidence level is set low in the case where the shining of the light is biased. With respect to the intensity of the contrast, for example, the confidence level is set low in the case where the contrast is weak and the amount of information is small.

In the case where the item to be determined is a gender, the combination shown in FIG. 3A(c) can be performed by the following equation (6), for example.

$$\text{Gender degree of object to be determined} = \frac{\begin{pmatrix}\text{Confidence level}\\ \text{in gender of head}\end{pmatrix} \times \begin{pmatrix}\text{Gender degree}\\ \text{of head}\end{pmatrix} + \begin{pmatrix}\text{Confidence level}\\ \text{in gender}\\ \text{of face}\end{pmatrix} \times \begin{pmatrix}\text{Gender degree}\\ \text{of face}\end{pmatrix} + \begin{pmatrix}\text{Confidence level}\\ \text{in gender of}\\ \text{whole-body}\end{pmatrix} \times \begin{pmatrix}\text{Gender degree}\\ \text{of whole-body}\end{pmatrix}}{\begin{pmatrix}\text{Confidence level}\\ \text{in gender of head}\end{pmatrix} + \begin{pmatrix}\text{Confidence level}\\ \text{in gender of face}\end{pmatrix} + \begin{pmatrix}\text{Confidence level in}\\ \text{gender of whole-body}\end{pmatrix}} \quad (6)$$

In the equation (6), the "gender degree of whole-body" is the gender degree of the whole-body region calculated in the attribute determining step S22. The "gender degree of head" and "gender degree of face" are the same as those described for the equation (5). The "confidence level in gender of whole-body" can be expressed, for example, by a value greater than 0 and not more than 1 and indicates the level of the reliability of the gender degree of the whole-body region calculated in the attribute determining step S22. The "confidence level in gender of head" and "confidence level in gender of face" are the same as those described for the equation (5).

An example of the condition having an influence on the confidence level in gender of the whole-body includes the angle (direction) of the whole-body. In the case where it is known that accuracy is high if the gender is determined based on the whole-body image of a front-facing person and accuracy is slightly decreased if the gender is determined based on the whole-body image of a diagonally-facing person, the confidence level of the former case is set high (numerical value of nearly 1) and the confidence level of the latter case is set low (numerical value of nearly 0). Examples of the condition having an influence on the confidence level include, besides the angle (direction) of the whole-body, the hiding level of the whole-body, the quality of the image of person(s) to be determined, the size of the whole-body region in the image of person(s) to be determined, the condition of shining of the light, and the intensity of the contrast. Specifically, with respect to the hiding level of the whole-body, for example, the confidence level is set low in the case where a hidden area is large. With respect to the quality of the image of person(s) to be determined, for example, the confidence level is set low in the case of an image with large camera shaking or of a noisy image. With respect to the size of the whole-body region in the image of person(s) to be determined, for example, the confidence level is set low in the case where the whole-body region is small. With respect to the condition of shining of the light, for example, the confidence level is set low in the case where the shining of the light is biased. With respect to the intensity of the contrast, for example, the confidence level is set low in the case where the contrast is weak and the amount of information is small.

Figure 3B:
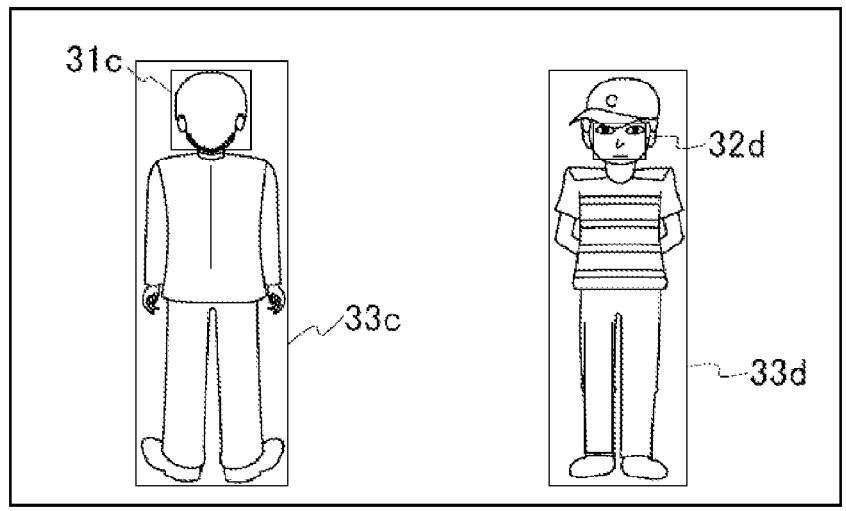
FIGS. 3B(a) to (c) are views for explaining another example of the attribute determination region detecting step and the attribute determining step in the present invention.
Figure 3B:
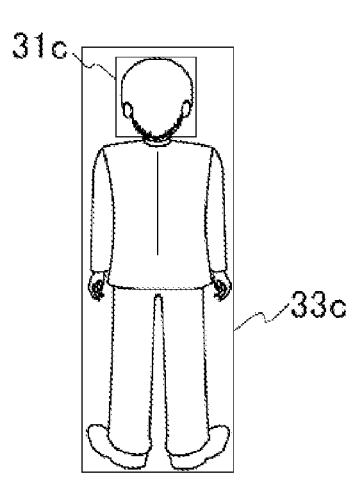
Figure 3B:
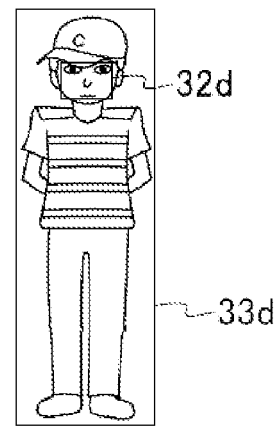

FIG. 3B(a) shows another example of the image of person(s) to be determined. FIG. 3B(a) is an image showing more than one person. FIG. 3B(a) shows the whole-body of a rear-facing person on the left side and shows the whole-body of a front-facing person with a hat on the right side.

First, by the attribute determination region detecting means 121, by referring to the attribute determination region detection model 141 acquired preliminarily, attribute determination regions are detected. As a result, as shown in FIG. 3 B(a), for example, the head region 31c, the facial region 32d, and the whole-body regions 33c and 33d are detected.

Next, in the same manner as in FIG. 3A(a), by the attribute determining means 122, by referring to the attribute determination model 142 acquired preliminarily, attributes of the head region 31c, the facial region 32d, and the whole-body regions 33c and 33d are determined.

Next, in the same manner as in FIG. 3A(a), whether or not each of the head region 31c, the facial region 32d, and the whole-body regions 33c and 33d belongs to the same person is determined using the overlap degree. Then, for example, it is determined that the head region 31c and the whole-body region 33c belong to the person on the left side in FIG. 3 B(a) and the facial region 32d and the whole-body region 33d belong to the person on the right side in FIG. 3 B(a).

Next, as shown in FIG. 3 B(b), the attribute is determined by combining the head region 31c and the whole-body region 33c. Further, as shown in FIG. 3 B(c), the attribute is determined by combining the facial region 32d and the whole-body region 33d.

In the case where the item to be determined is a gender, the combination shown in FIG. 3 B(b) can be performed by the following equation (7), for example.

$$\text{Gender degree of object to be determined} = \frac{\left(\begin{array}{c}\text{Confidence level} \\ \text{in gender of head}\end{array}\right) \times \left(\begin{array}{c}\text{Gender degree} \\ \text{of head}\end{array}\right) + \left(\begin{array}{c}\text{Confidence level} \\ \text{in gender of} \\ \text{whole-body}\end{array}\right) \times \left(\begin{array}{c}\text{Gender degree} \\ \text{of whole-body}\end{array}\right)}{\left(\begin{array}{c}\text{Confidence level} \\ \text{in gender of head}\end{array}\right) + \left(\begin{array}{c}\text{Confidence level} \\ \text{in gender of whole-body}\end{array}\right)} \quad (7)$$

In the equation (7), the "gender degree of head" and the "confidence level in gender of head" are the same as those described for the equation (5); and the "gender degree of whole-body" and the "confidence level in gender of whole-body" are the same as those described for the equation (6).

In the case where the item to be determined is a gender, the combination shown in FIG. 3 B(c) can be performed by the following equation (8), for example.

$$\text{Gender degree of object to be determined} = \frac{\left(\begin{array}{c}\text{Confidence level} \\ \text{in gender of face}\end{array}\right) \times \left(\begin{array}{c}\text{Gender degree} \\ \text{of face}\end{array}\right) + \left(\begin{array}{c}\text{Confidence level} \\ \text{in gender of} \\ \text{whole-body}\end{array}\right) \times \left(\begin{array}{c}\text{Gender degree} \\ \text{of whole-body}\end{array}\right)}{\left(\begin{array}{c}\text{Confidence level} \\ \text{in gender of face}\end{array}\right) + \left(\begin{array}{c}\text{Confidence level} \\ \text{in gender} \\ \text{of whole-body}\end{array}\right)} \quad (8)$$

In the equation (8), the "gender degree of face" and the "confidence level in gender of face" are the same as those described for the equation (5); and the "gender degree of whole-body" and the "confidence level in gender of whole-body" are the same as those described for the equation (6).

As described above, in the attribute determining method of the first exemplary embodiment, an attribute is determined based on images of at least two attribute determination regions selected from the group consisting of the head region, the facial region, and the whole-body region. That is, an attribute is determined by hybridizing the at least two attribute determination regions. Therefore, according to the attribute determining method of the first exemplary embodiment, even in the case where there is a region that cannot be detected, the detection accuracy of a person is high and an attribute of a person can be determined. In other words, for example, as shown in FIG. 3B(b), even in the case where the characteristic parts of the face are hidden, an attribute of a person can be determined based on the two images of the head region and the whole-body region. This makes it possible to expand the range of choices for a site where image acquiring means (for example, surveillance camera, and the like) is placed, for example. For example, it is possible to use existing surveillance cameras and the like. Further, since not only the face but the head and the whole-body are used for determining an attribute, unlike the case of only using the face in which the attribute determination is difficult unless an image showing a person facing nearly the front is used, for example, the attribute determination can be made with images (frames) showing persons shot from any directions such as an image showing a person shot from the rear side. Therefore, for example, there is no need to shoot many frames. Further, since images showing persons shot from any directions can be used for determining an attribute, for example, variety of information can be acquired. Comprehensively, the attribute can be determined with higher accuracy. Further, for example, as shown in FIG. 3B(c), even in the case where the head is hidden because the person wears a cap, an attribute of a person can be determined based on the two images of the facial region and the whole-body region. According to the attribute determining method of the first exemplary embodiment, as shown in FIG. 3A(c), for example, the attribute of a person can be determined with higher accuracy by determining an attribute based on the three attribute determination regions, namely, the head region, the facial region, and the whole-body region.

Each of the images of person(s) to be determined shown in FIG. 3A(a) and FIG. 3B(a) is an example with one image (one frame). However, the present invention is not limited to this example. In the case where the number of frames is more than one, for example, the combination of the two images of the head region and the facial region can be performed by the following equation (9), for example. By increasing the number of frames, for example, the attribute of a person can be determined more correctly. In the equation (9), "n" represents the number of frames. Also with respect to other combinations of the head region, the facial region, and the whole-body region, the combination in the case of more than one frames can be performed, for example, by an equation having a concept similar to the equation (9).

$$\text{Gender degree of objected to be determined} = \qquad (9)$$

$$\frac{\sum_{i=1}^{n}\left\{\left(\begin{array}{c}\text{Confidence level}\\ \text{in gender of head}\\ \text{in image } i\end{array}\right)\times\left(\begin{array}{c}\text{Gender degree}\\ \text{of head}\end{array}\right)\right\}+\sum_{i=1}^{n}\left\{\left(\begin{array}{c}\text{Confidence level}\\ \text{in gender of face}\\ \text{in image } i\end{array}\right)\times\left(\begin{array}{c}\text{Gender degree}\\ \text{of face}\end{array}\right)\right\}}{\sum_{i=1}^{n}\left(\begin{array}{c}\text{Confidence level}\\ \text{in gender of head}\\ \text{in image } i\end{array}\right)+\sum_{i=1}^{n}\left(\begin{array}{c}\text{Confidence level}\\ \text{in gender of face}\\ \text{in image } i\end{array}\right)}$$

Figure 1C:
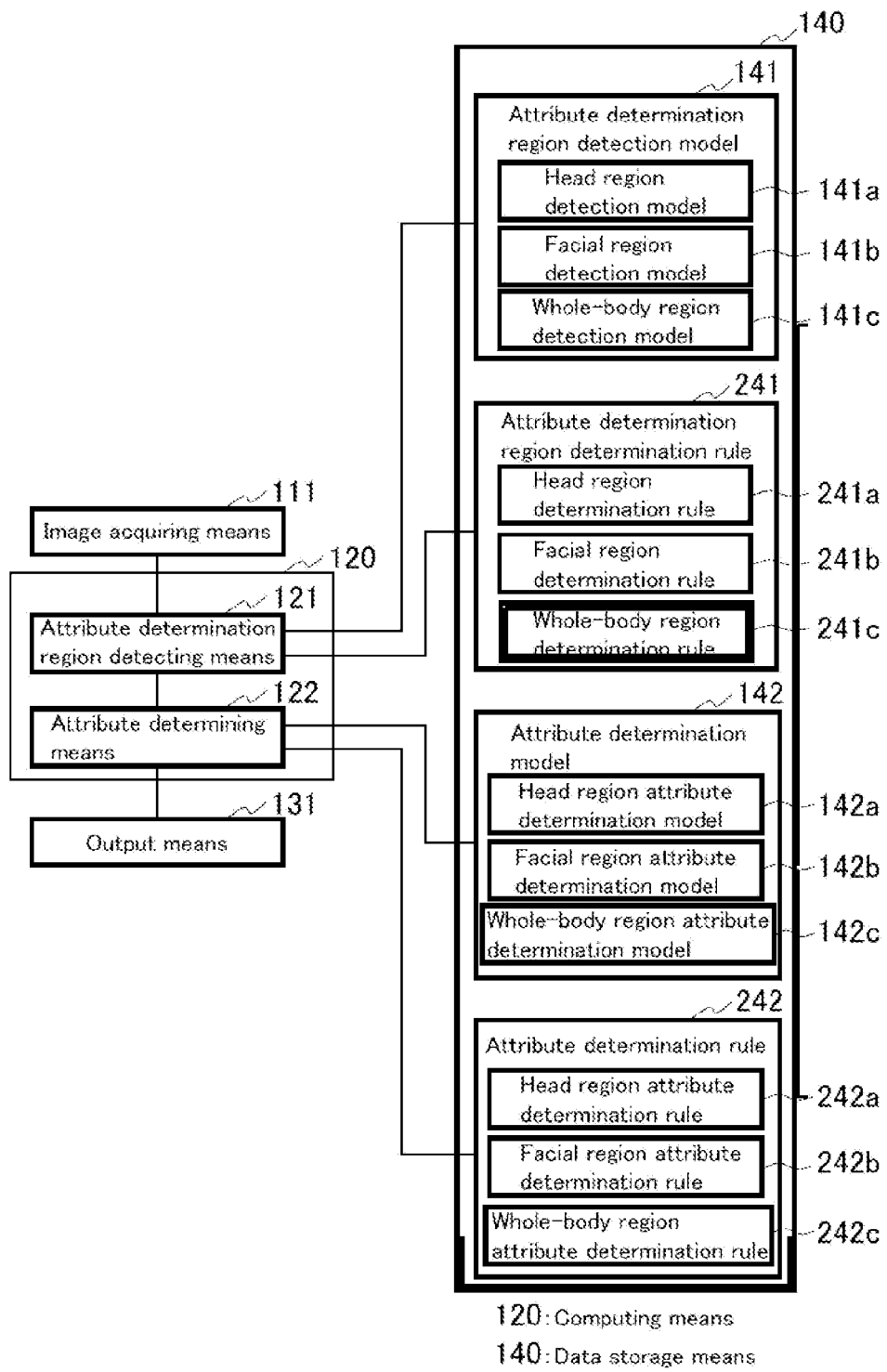
FIG. 1C is a block diagram showing the configuration of another example of the attribute determining apparatus of the first exemplary embodiment.

In the attribute determination region detecting step (S21 in FIG. 1A), at least two attribute determination regions selected from the group consisting of the head region, the facial region, and the whole-body region are detected from the image of person(s) to be determined by referring to the attribute determination region detection model. However, the present invention is not limited thereto. The attribute determination region may be detected by referring to the attribute determination region determination rule, for example. Examples of the attribute determination region determination rule include a head region determination rule, a facial region determination rule, and a whole-body region determination rule. An example of the head region determination rule includes the rule such as "a circular object in an image of person(s) to be determined is a head region". An example of the facial region determination rule includes the rule such as "two areas darker than their surroundings in an image of person(s) to be determined are regarded as candidates for eyes, and if the area vertically below the center of the line connecting the two areas is darker than its surroundings, the area is determined as the mouth, and the region surrounding these areas is a facial region". An example of the whole-body region determination rule includes the rule such as "with the assumption that a circular object in an image of person(s) to be determined is a head region, in the case where the lower part of the head region is observed and the height of a dynamic part is 4 times to 9 times the height of the head region, the region surrounding the dynamic part is the whole-body region". The "dynamic part" refers to a part that differs among frames, for example. Specifically, for example, the region of a dynamic object detected by obtaining the background difference or the difference between frames refers to the "dynamic part". Further, for example, the attribute determination region may be detected by referring to both the attribute determination region detection model and the attribute determination region determination rule. In this case, for example, as shown in FIG. 1C, an attribute determination region determination rule 241 may be stored in the data storage means 140 and the attribute determination region detecting means 121 may be connected to the attribute determination region determination rule 241. The attribute determination region determination rule 241 includes a head region determination rule 241a, a facial region determination rule 241b, and a whole-body region determination rule 241c.

In the attribute determining step (S22 in FIG. 1A), an attribute is determined based on at least two of the images of the head region, the facial region, and the whole-body region by referring to the attribute determination model. However, the present invention is not limited thereto. The attribute may be determined by referring to the attribute determination rule, for example. Examples of the attribute determination rule include a head region attribute determination rule, a facial region attribute determination rule, and a whole-body region attribute determination rule. An example of the head region attribute determination rule includes the rule such as "it is determined as a female if the hair is long and it is determined as a male if the hair is short". Examples of the facial region attribute determination rule include the rules such as "it is determined as a female if the eyes are large and eyebrows are fine", "it is determined as an elderly person if many edge components (wrinkles) are extracted from an image of the facial region", and "it is determined as a child if the facial parts such as the eyes, the nose, and the mouth are positioned at a lower part of the facial region". Examples of the whole-body region attribute determination rule include the rules such as "it is determined as a female if the colors like red and pink are seen in a large portion of the clothing region and it is determined as a male if the color like blue is seen in a large portion of the clothing region" and "it is determined as a male if a person wears pants and it is determined as a female if a person wears a skirt". Further, for example, the attribute may be determined by referring to both the attribute determination model and the attribute determination rule. In this case, for example, as shown in FIG. 1C, an attribute determination rule 242 may be stored in the data storage means 140 and the attribute determining means 122 may be connected to the attribute determination rule 242. The attribute determination rule 242 includes a head region attribute determination rule 242a, a facial region attribute determination rule 242b, and a whole-body region attribute determination rule 242c.

As described above, in the attribute determining method of the first exemplary embodiment, the whole-body of a person is detected as the other region. However, the present invention is not limited thereto. The other region may be a part of the whole-body of a person and examples thereof include the upper body; the lower body; a hair region such as a hairstyle; facial parts such as the eyes, the nose, and the mouth; belongings such as a bag; clothing such as a hat, shoes, and socks; and an accessory such as a necklace. In the case where a part of the whole-body is the upper body, the upper body may be the upper body including a head region or a facial region, for example. In the case of using a part of the whole-body, it is preferable to refer to a detection model for detecting a part of the whole-body and an attribute determination model for determining an attribute of a part of the whole-body.

[Exemplary Embodiment 2]

The program of the second exemplary embodiment is a program that allows a computer to execute the attribute determining method. The program of the second exemplary embodiment may be recorded, for example, in a recording medium. There is no particular limitation on the recording medium, and examples of the recording medium include a random access memory (RAM), a read-only memory (ROM), a hard disk (HD), an optical disk, and a floppy (registered trade mark) disk (FD).

[Exemplary Embodiment 3]

Figure 4:
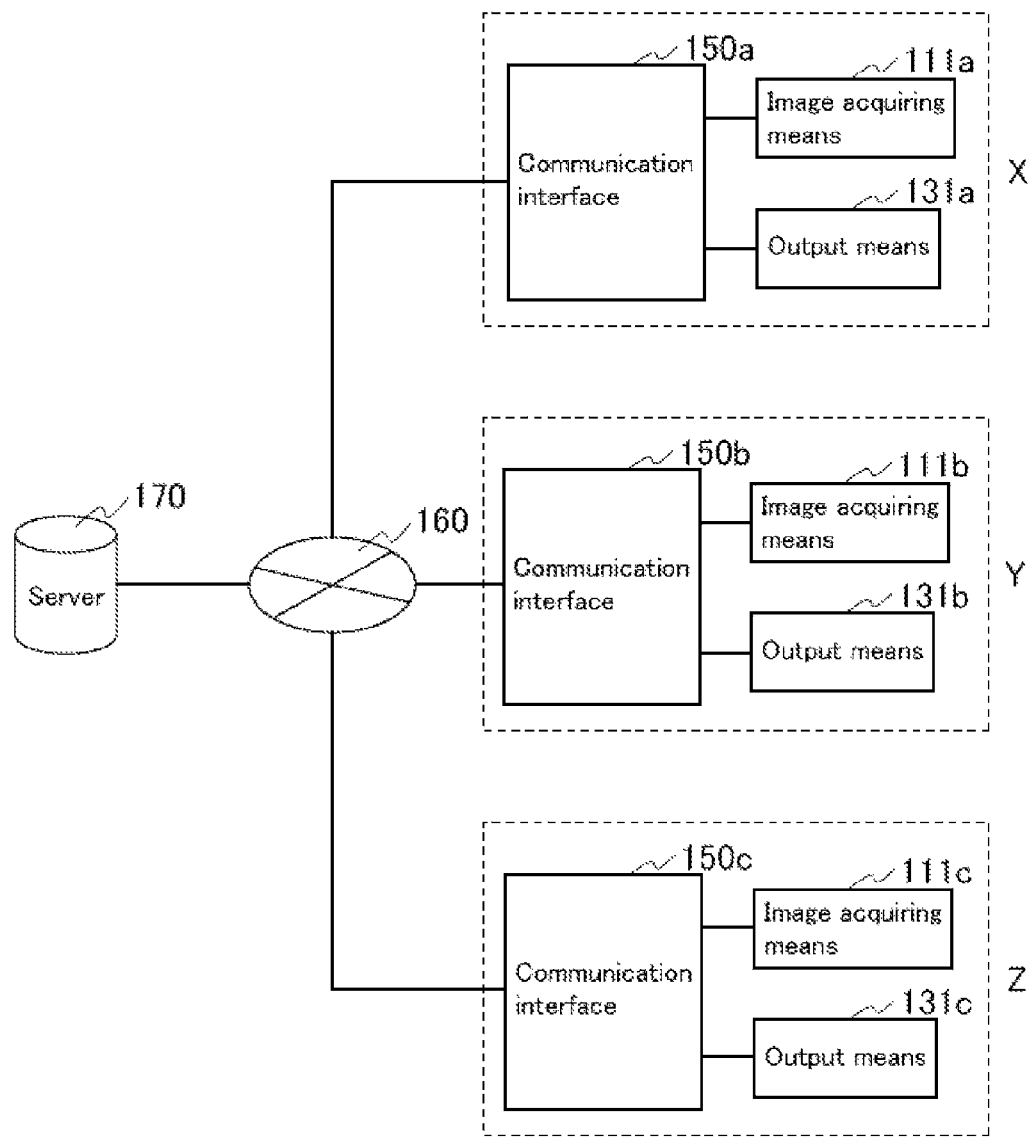
FIG. 4 is a block diagram showing the configuration of an example (third exemplary embodiment) of the attribute determining system using the attribute determining apparatus of the present invention.

FIG. 4 shows the configuration of an example of the attribute determining system using the attribute determining apparatus of the present invention. As shown in FIG. 4, the attribute determining system is provided with image acquiring means (units) 111a, 111b, and 111c; output means (units) 131a, 131b, and 131c; communication interfaces 150a, 150b, and 150c; and a server 170. The image acquiring means 111a and the output means 131a are connected to the communication interface 150a. The image acquiring means 111a, the output means 131a, and the communication interface 150a are arranged at the site "X". The image acquiring means 111b and the output means 131b are connected to the communication interface 150b. The image acquiring means 111b, the output means 131b, and the communication interface 150b are arranged at the site "Y". The image acquiring means 111c and the output means 131c are connected to the communication interface 150c. The image acquiring means 111c, the output means 131c, and the communication interface 150c are arranged at the site "Z". The communication interfaces 150a, 150b, and 150c are connected to the server 170 via a network 160.

This attribute determining system includes attribute determination region detecting means and attribute determining means at the server 170 side, and an attribute determination region detection model and an attribute determination model are stored in the server 170. For example, an image of person(s) to be determined acquired at the site "X" using the image acquiring means 111a is sent to the server 170, at least two attribute determination regions selected from the group consisting of the head region, the facial region, and other regions are detected at the server 170 side, and the determination of the attribute is performed based on the images of the at least two attribute determination regions. Then, among the detected attribute determination regions and the determined attribute, at least the attribute is outputted by the output means 131a. For example, the attribute determination region determination rule and the attribute determination rule may be stored in the server.

According to the attribute determining system of the third exemplary embodiment, by arranging the image acquiring means and the output means on-site and arranging the server and the like at other sites, the attribute determination region detection and attribute determination can be performed online. Therefore, for example, the system does not require a space for arranging devices and maintenance is not complicated. Furthermore, for example, even in the case where the sites at which the devices are arranged are distanced from one another, the system can be controlled centrally or remotely. The attribute determining system of the third exemplary embodiment may be, for example, the system corresponding to cloud computing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-237945 filed on Oct. 22, 2010, the disclosure of which is incorporated herein in its entirety by reference.

Industrial Applicability

The present invention can provide an attribute determining method, an attribute determining apparatus, a program, a recording medium, and an attribute determining system of high detection accuracy of a person with which an attribute of a person can be determined, for example, even in the case where characteristic parts of the face are hidden. Therefore, for example, an attribute of a person can be determined using an existing surveillance camera or the like, and the present invention can be applied to a wide range of fields.

Explanation of reference numerals

| | |
|---|---|
| 10a, 10b, 10c, and 10d | image for learning |
| 11a, 11b, 11c, and 11d | label |
| 21, 21e, 31a, 31b, and 31c | head region |
| 21a | head region (B) (region obtained by deforming facial region 22 at predetermined ratio) |
| 21b | head region (D) (region obtained by deforming whole-body region 23 at predetermined ratio) |
| 22, 32a, 32b, and 32d | facial region |
| 23, 33b, 33c, and 33d | whole-body region (other region) |
| 24 | region (C) in which head region (A) and head region (B) are overlapped |
| 111, 111a, 111b, and 111c | image acquiring means |
| 120 | computing means |
| 121 | attribute determination region detecting means |
| 122 | attribute determining means |
| 131, 131a, 131b, and 131c | output means |
| 140 | data storage means |
| 141 | attribute determination region detection model |
| 141a | head region detection model |
| 141b | facial region detection model |
| 141c | whole-body region detection model |
| 142 | attribute determination model |
| 142a | head region attribute determination model |
| 142b | facial region attribute determination model |
| 142c | whole-body region attribute determination model |
| 150a, 150b, and 150c | communication interface |
| 160 | network |
| 170 | server |
| 241 | attribute determination region determination rule |
| 241a | head region determination rule |
| 241b | facial region determination rule |
| 241c | whole-body region determination rule |
| 242 | attribute determination rule |
| 242a | head region attribute determination rule |
| 242b | facial region attribute determination rule |
| 242c | whole-body region attribute determination rule |

The invention claimed is:

1. An attribute determining method comprising:
an image acquiring step of acquiring an image of a person to be determined;
an attribute determination region detecting step of detecting at least two attribute determination regions selected from the group consisting of a head region, a facial region, and other regions from the image of a person to be determined; and
an attribute determining step of determining an attribute based on images of the at least two attribute determination regions, wherein
in the attribute determining step, an attribute is determined by combining the images of the at least two tribute determination regions, and
in the combination of images, whether or not the at least two attribute determination regions belong to a same person is determined using an overlap degree of one of the attribute determination regions and an attribute determination region other than the one of the attribute determination regions.

2. The method according to claim 1, wherein the other regions include a whole-body and a part of the whole-body.

3. The method according to claim 1, wherein, in the combination of the images, whether or not the at least two attribute determination regions belong to the same person is determined using an overlap degree represented by the following equation (3):

$$\text{overlap degree} = (2 \times X \times Y)/(X+Y) \quad (3)$$

X: Ratio of the area of a region in which one of the attribute determination regions and a region obtained by deforming an attribute determination region other than the one of the attribute determination regions at a predetermined ratio is overlapped to the area of the one of the attribute determination regions Y: Ratio of the area of the overlapped region to the area of the region obtained by deforming at a predetermined ratio.

4. The method according to claim 3, wherein in the case where the overlap degree is equal to or more than a value of a predetermined threshold, it is determined that the at least two attribute determination regions belong to the same person.

5. An attribute determining apparatus comprising:
at least one processor which implements:
an image acquiring unit which acquires an image of a person to be determined;
an attribute determination region detecting unit which detects at least two attribute determination regions selected from the group consisting of a head region, a facial region, and other regions from the image of a person to be determined; and
an attribute determining unit which determines an attribute based on images of the at least two attribute determination regions, wherein
the attribute determining unit is configured to determine an attribute by combining the images of the at least two attribute determination regions, and
in the combination of images, whether or not the at least two attribute determination regions belong to a same person is determined using an overlap degree of one of the attribute determination regions and an attribute determination region other than the one of the attribute determination regions.

6. The apparatus according to claim 5, wherein the other regions include a whole-body and a part of the whole-body.

7. The apparatus according to claim 5, wherein, in the combination of the images, whether or not the at least two attribute determination regions belong to the same person is determined using an overlap degree represented by the following equation (3):

$$\text{overlap degree} = (2 \times X \times Y)/(X \times Y) \qquad (3)$$

X: Ratio of the area of a region in which one of the attribute determination regions and a region obtained by deforming an attribute determination region other than the one of the attribute determination regions at a predetermined ratio are overlapped to the area of the one of the attribute determination regions Y: Ratio of the area of the overlapped region to the area of the region obtained by deforming at a predetermined ratio.

8. The apparatus according to claim 7, wherein in the case where the overlap degree is equal to or more than a value of a predetermined threshold, it is determined that the at least two attribute determination regions belong to the same person.

9. A non-transitory computer-readable medium having recorded thereon a program, for causing a computer to execute the attribute determining method according to claim 1.

10. An attribute determining system comprising:
at least one processor which implements:
an image acquiring unit which acquires an image of a person to be determined;
an attribute determination region detecting unit which detects at least two attribute determination regions selected from the group consisting of a head region, a facial region, and other regions from the image of a person to be determined;
an attribute determining unit which determines an attribute based on images of the at least two attribute determination regions; and
an output unit which outputs a result of an attribute determination, wherein the image acquiring unit and the output unit are connected to the attribute determination region detecting unit and the attribute determining unit via a communication network provided outside of the system, wherein
the attribute determining unit is configured to determine an attribute by combining the images of the at least two attribute determination regions, and
in the combination of images, whether or not the at least two attribute determination regions belong to a same person is determined using an overlap degree of one of the attribute determination regions and an attribute determination region other than the one of the attribute determination regions.

* * * * *

UNITED STATES PATENT AND TRADEMARK OFFICE
CERTIFICATE OF CORRECTION

PATENT NO. : 9,053,356 B2
APPLICATION NO. : 13/880436
DATED : June 9, 2015
INVENTOR(S) : Kazuya Ueki Page 1 of 1

It is certified that error appears in the above-identified patent and that said Letters Patent is hereby corrected as shown below:

IN THE SPECIFICATION

Column 15, Line 1: Delete "objected" and insert -- object --

IN THE CLAIMS

Column 18, Line 49: In Claim 1, delete "tribute" and insert -- attribute --

Column 19, Line 41: In Claim 7, delete "overlap degree=$(2 \times X \times Y)/(X \times Y)$" and insert -- overlap degree=$(2 \times X \times Y)/(X+Y)$ --

Signed and Sealed this
Twenty-second Day of December, 2015

Michelle K. Lee
*Director of the United States Patent and Trademark Office*